United States Patent [19]

McCartney

[11] 4,448,922

[45] May 15, 1984

[54] COAGULATED POLYURETHANE COATING COMPOSITIONS

[75] Inventor: John R. McCartney, Westown, Pa.

[73] Assignee: Norwood Industries, Inc., Malvern, Pa.

[21] Appl. No.: 398,259

[22] Filed: Jul. 14, 1982

Related U.S. Application Data

[60] Continuation-in-part of Ser. No. 188,329, Sep. 18, 1980, Pat. No. 4,376,148, and a continuation-in-part of Ser. No. 188330, Sep. 18, 1980, Pat. No. 4,342,805, and a continuation-in-part of Ser. No. 321,246, Nov. 13, 1981, Pat. No. 4,366,192, which is a division of Ser. No. 234,464, Feb. 17, 1981, Pat. No. 4,332,710.

[51] Int. Cl.$^3$ ............................................. C08L 75/04
[52] U.S. Cl. .................................... 524/443; 524/457; 524/501; 524/589; 427/246
[58] Field of Search .............. 524/443, 457, 589, 501; 427/246

[56] References Cited

U.S. PATENT DOCUMENTS

| | | | |
|---|---|---|---|
| 2,653,918 | 9/1953 | Eckert | 524/443 |
| 2,993,013 | 7/1961 | Wolfe | 521/67 |
| 3,969,551 | 7/1976 | Ellsworth | 427/282 |
| 4,094,685 | 6/1978 | Lester et al. | 521/85 |
| 4,199,490 | 4/1980 | Kamiya et al. | 525/95 |
| 4,332,710 | 6/1982 | McCartney | 524/591 |

Primary Examiner—Lorenzo B. Hayes
Assistant Examiner—Amelia B. Yarbrough
Attorney, Agent, or Firm—Webb, Burden, Robinson & Webb

[57] ABSTRACT

An aqueous coating composition is comprised of an aqueous anionic polyurethane dispersion and a salt of hydrofluorosilicic acid, wherein the pH of the composition is acidic and the composition is thixotropic. The composition is particularly useful for coating irregular substrates to form a regular surface thereon.

9 Claims, No Drawings

COAGULATED POLYURETHANE COATING COMPOSITIONS

CROSS-REFERENCE TO RELATED APPLICATIONS

This application is a continuation-in-part of U.S. patent application Ser. Nos. 188,329, filed Sept. 18, 1980, now U.S. Pat. No. 4,376,148; 188,330, filed Sept. 18, 1980, now U.S. Pat. No. 4,342,805; and U.S. patent application Ser. No. 321,246, filed Nov. 13, 1981, now U.S. Pat. No. 4,366,192, which is a division of U.S. patent application Ser. No.234,464, filed Feb. 17, 1981, now U.S. Pat. No. 4,332,710.

BACKGROUND OF THE INVENTION

1. Field of the Invention

This invention relates to polyurethane dispersions, and more particularly, to coagulated polyurethane dispersions useful as coating compositions.

2. Description of the Prior Art

Natural leather, appropriately finished, is valued for its durability and aesthetic characteristics in a plurality of uses. Due to the scarcity of leather and the increased cost of processing leather for particular applications, economics have dictated that synthetic materials be substituted in certain applications where leather goods had been used. Such synthetic materials have been proposed and used in the areas of shoe uppers, upholstery, clothing, luggage making, book binding and similar applications. Because these various applications require varying physical, chemical and aesthetic qualities, different processes using different materials must be used to obtain an acceptable product which is comparable to natural leather; although in most instances these synthetics are readily distinguishable from natural leather.

One method of preparing a synthetic as a substitute for leather involves impregnating and/or coating a porous material, for example, cloth, with a polyurthane, vinyl or a similar material. Polyurethanes have met with wide acceptance as a coating or impregnating composition due to their capability of wide variation in chemical and physical properties, particularly their flexibility and chemical resistance.

Objectives in preparing these synthetic substitutes for leather are that they provide: (1) sheets especially suitable for leather-like and upholstery uses; (2) sheets of uniform width as commonly used in the textile industry (unlike natural products which sustain substantial weight and area losses in cutting and finishing); (3) end use versatility, for example, under a variety of exposure conditions where certain chemical treatments will assist maintenance and useful lifetime of properties; (4) and most importantly, a product with the strength, hand, drape and softness comparable to natural leather.

Further, an impregnated fabric sheet material when used for shoe uppers, should be characterized by a leather-like appearance, with no undesirable fabric show-through, good water vapor permeation into the uncoated inside of the upper, and the leather-like grain break (minimal gross wrinkling). "Leather-like grain break", as recognized in the leather and upholstery industries, is manifested in the behavior of well finished leather when folded or crumpled. The leather fold is characterized by a smooth, curved contour, frequently with numerous fine wrinkles in the compressed region of the fold area. This is contrasted with sharp creases or gross wrinkles formed when papers or films are folded; this kind of undesirable appearance is known as "pin wrinkling".

In another application it is desired to provide a strengthened fabric that can be sanded or buffed, giving an aesthetically pleasing surface and then used without additional coating as an upholstery material. In upholstery, important characteristics include strength, reduced bias elongation, and enhanced appearance, i.e. a well filled fabric, without substrate show-through, which has softness, drape and conformability. The bias elongation is important in shoe uppers as well as upholstery, and reflects a desirable resistance to stretch in the more highly stressed areas of the fabric in the end use; excessive stretch in a fabric will result in pin wrinkling and show-through.

Polyurethane polymers as coatings or impregnants for fabric have long been recognized as providing some of the aforementioned characteristics. For example, polyurethanes can be made which are highly resistant to solvents and abrasion, conferring dry-cleanability and outstanding durability to coated fabrics. The basic chemistry of polyurethanes, involving reactions between the isocyanate groups and molecules with multiple reactive hydrogens, such as polyols and polyamines, afford great versatility and variability in final chemical and physical properties by the selection of intermediates to achieve processability and the desired balance of end use performance requirements.

There are various methods for applying polyurethane solutions or other post curable liquid polymers to porous substrates which are well known to those skilled in the art. An article in *Journal of Coated Fabrics*, Vol. 7 (July 1977), pp. 43–57 describes some of the commercial coating systems, e.g. reverse roll coating, pan fed coater, gravure and the like. Brushing and spraying may also be used to coat polyurethanes on porous substrates. These polyurethane solutions, after impregnation or coating on the porous substrate, are dried or cured by a method such as heated air, infrared radiation and the like. Characteristic of these processes is the deposition of a polymer and a film-like layer which tends to produce a coated fabric which folds in undesirable sharp creases rather than a leather-like grain break.

Another method of combining polyurethane solutions with porous substrates is disclosed in U.S. Pat. No. 3,208,875. Briefly, this method involves the application of a solution of a polymer in an organic solvent to a substrate (such as a needle punched polyester batt) with subsequent bathing of the polymeric layer with a mixture of an organic solvent for the polymer and a non-solvent for the polymer that is at least partially miscible with the solvent until the layer is coagulated into a cellular structure of interconnected micropores. The solvent is removed from the coating layer along with the non-solvent to produce a solvent-free microporous layer. Although this process yields acceptable properties for a polyurethane impregnated fabric, it has the disadvantages of an organic solvent system, particularly when high performance polyurethanes are utilized which require relatively toxic and high boiling solvents.

Polyurethane dispersions in organic vehicles have been proposed and used to coat fabrics. U.S. Pat. No. 3,100,721 discloses dispersions made by the addition of non-solvent to polyurethane solutions. A dispersion, applied to a substrate, is coagulated by further addition of a non-solvent.

In another aspect of forming coated fabrics with aesthetically pleasing end properties along with adequate physical properties, fabrics have been coated with a foam or microporous layer and then subsequently finished with a pigmented material along with a clear finish coat. This approach eliminates the "telegraph" of the fibers of the substrate and enables a regular surface to be imparted to the fabric which was initially an irregular surface. Direct coating of fabrics and other irregular surfaces results in the telegraphing effect in which the irregular surface of the initial fabric shows through the coated product. Exemplary of the approaches of forming a microporous layer on the fabric is shown in U.S. Pat. No. 3,632,417. Further approaches are exemplified by U.S. Pat. No.3,418,198 which teach that a microporous interlayer on the fabric be provided having a smoothness factor of not more than 15 mils. This smoothness factor of 15 mils means that 15 mils or less of the dried coating that is coated upon the substrate will provide a smooth coating which hides the pattern or texture of the coated fabric.

In still another prior art method, such as disclosed in U.S. Pat. No. 3,418,198, a "non-roughening" impregnated material is proposed.

Various methods of impregnating fabrics and non-woven sheet materials have been utilized. Among these methods are those disclosed in U.S. Pat. No. 4,171,391 entitled "Method of Preparing Composite Sheet Material"; U.S. patent application Ser. No. 188,329, filed Sept. 18, 1980 by John McCartney, along with several modifications thereof as is diclosed in U.S. Pat. No. 4,332,710. These approaches have achieved a certain degree of success in forming leather-like materials; however, it is desirable in some instances to coat some of these substrates with a microporous layer in order to form a regular surface which does not telegraph any of the imperfections or textile pattern of the fibrous substrate.

In accordance with the present invention, a coating composition is provided which forms a microporous layer on an irregular surface or substrate, thus eliminating this telegraphing or roughening effect.

Further in accordance with the present invention, a coating composition for irregular surfaces is provided which can be directly finished, thereby eliminating the need for a further coating of the microporous layer.

These and other advantages are achieved by the invention.

BRIEF DESCRIPTION OF THE INVENTION

An aqueous coating composition is comprised of an aqueous anionic polyurethane dispersion and a salt of hydrofluorosilicic acid, wherein the pH of the composition is acidic and the composition is thixotropic. The composition is particularly useful for coating irregular substrates to form a regular surface thereon.

The anionic polyurethane dispersions useful in the practice of the invention in forming the coating compositions are those dispersions which preferably have free acid groups; preferably, carboxylic acid groups covalently bonded to the polymer backbone.

Neutralization of these carboxyl groups with an amine, preferably a water soluble monoamine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hindrance of the carboxyl by the adjacent alkyl groups. This approach provides the desired carboxyl-containing polymer with the carboxylic groups being neutralized with the tertiary monoamine to provide an internal quaternary ammonium salt and, hence, water dilutability.

Suitable carboxylic acids, and preferably the stearically hindered carboxylic acids, are well known and readily available. For example, they may be prepared from an aldehyde that contains at least 2 hydrogens in the alpha position which are reacted in the presence of a base with 2 equivalents of formaldehyde to form 2,2-hydroxymethyl aldehyde. The aldehyde is then oxidized to the acid by procedures known to those skilled in the art. Such acids are represented by the structural formula,

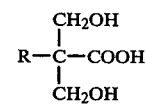

wherein R represents hydrogen, or alkyl of up to 20 carbon atoms, and preferably up to 8 carbon atoms. A preferred acid is 2,2-di(hydroxymethyl)propionic acid. The polymers with the pendant carboxyl groups are characterized as anionic polyurethane polymers.

The polyurethanes useful in the practice of the invention more particularly involve the reaction of di- of polyisocyanates and compounds with multiple reactive hydrogens suitable for the preparation of polyurethanes. Such diisocyanates and reactive hydrogen compounds are more fully disclosed in U.S. Pat. Nos. 3,412,034 and 4,046,729. Further, the processes to prepare such polyurethanes are well recognized as exemplified by the aforementioned patents. In accordance with the present invention, aromatic, aliphatic and cyclo-aliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cyclo-aliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cyclo-aliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation, which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane impregnated sheet material. In addition, antioxidants may be added in art recognized levels to improve the characteristics of the final product. Typical antioxidants are the thioethers and phenolic antioxidants such as 4,4'-butylidine bis-meta-cresol and 2,6-ditert-butyl-para-cresol.

The isocyanate is reacted with the multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000, and in the context of the present invention, the most preferred is from about 400 to 7,000. Further, the polyether polyols improve flexibility proportionally with the increase in their molecular weight.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound $HO(CH_2OC_2H_4O)_nH$ wherein n is an integer greater than 1, can also be used.

The polyol may also be a hydroxy terminated or hydroxy pendant polyester which can be used instead or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred when flexibility is desired. These glycols are reacted with aliphatic, cyclo-aliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactone terminated with hydroxyl groups may also be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions", incorporated herein by reference.

When used herein, "ionic dispersing agent" means an ionizable acid or base capable of forming a salt with the solubilizing agent. These "ionic dispersing agents" are amines, and preferably water soluble amines, such as triethylamine, tripropylamine, N-ethyl piperidine and the like; also, acid, and preferably, water soluble acids such as acetic, propionic, lactic and the like. Naturally, an acid or amine will be selected contingent on the solubilizing group pendant on the polymer chain.

The desired elastomeric behavior would generally require about 25 to 80 percent by weight of long chain polyol (i.e. 700 to 2,000 eq. wt.) in the polymer. The degree of elongation and elasticity may vary widely from product to product, depending upon the desired properties of the final product.

In forming the polyurethanes useful in the practice of the invention, the polyol and a molar excess of diisocyanate are reacted to form isocyanate terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about 1 to 4 hours. To provide pendant carboxyl groups, the isocyanate terminated polymer is reacted with a molar deficiency of dihydroxy acid for 1 to 4 hours at 50° C. to 120° C. to form isocyanate terminated prepolymer. The acid is desirably added as a solution, for example, N-methyl-1,2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendant carboxyl groups are neutralized with an amine at about 58° C. to 75° C. for about 20 minutes, and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e. not capable of extensive further curing after formation except by the addition of the external curing agent.

Sufficient water is used to disperse the polyurethane at a concentration of about 10 to 40 percent by weight solids and a dispersion viscosity in the range of 10 to 1,000 centipoise. Viscosity may be adjusted in accordance with the particular properties desired and by the particular dispersion composition, which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

The characterization of the dispersions prepared in accordance with the invention is done by measurements of nonvolatile content, particle size, viscosity measurements and by stress/strain properties on strips of cast film.

In addition to the aqueous anionic polyurethane dispersion, a neoprene latex may be incorporated into the coating composition at a level of up to 65 percent of the weight solids of the coating composition. Necessarily, the neoprene latex must be a nonionically emulsified latex, as opposed to anionic or cationic emulsified or dispersed neoprene polymers.

Neoprene polymers are those elastomers which are based upon polychloroprene. In one particularly useful embodiment of the invention, the neoprene latex is emulsified or dispersed by means of polyvinyl alcohol, and the particular polymer is a copolymer of chloroprene and methacrylic acid with an acid equivalent of 0.33 mole carboxyl/kilogram latex solids.

When more than 65 percent by weight solids of the neoprene is incorporated into the coating composition, the composition is no longer thixotropic.

After the polyurethane dispersion is prepared, which may or may not include the neoprene latex, a sufficient amount of a salt of hydrofluorosilicic acid is incorporated into the dispersion in a sufficient amount to lower the pH of the composition to below 7, and more preferably between about 4 and 6.

The incorporation of silicofluoride into polyurethane dispersions is known according to U.S. Pat. No. 4,332,710. However, it was initially recognized to be useful in low levels, and when incorporated into the polyurethane dispersions and the dispersion heated, caused coagulation of the polyurethane. As that patent teaches, it was desirable to control the pH of the dispersion at about 7 to 9, otherwise an apparent gelation would occur. This pH was controlled by the use of a buffer such as borax or the like. However, in accordance with the present invention, when the silicofluoride is incorporated into the polyurethane dispersions, a composition is formed which is thixotropic and the pH is on the acidic side, i.e. below 7, and more preferably between 4 and 6. This thixotropic phenomenon is demonstrated as the material having a gel-like consistency in the static state, and upon agitation flows rapidly and has the rheological properties of a liquid composition rather than a gel-like composition.

It is to be noted that at ambient temperature the silicofluoride salt is at a low level of solubility, i.e. about 1 percent based on the total weight of dispersion. The time required for dissolution is dependent upon particle size of the silicofluoride salt. Typically, 40 mesh silicofluoride salt will dissolve in 10 to 15 minutes at ambient temperature.

The coating composition is formed by providing mild agitation to the polyurethane anionic aqueous dispersion, with or without the neoprene latex, to an extent that a vortex is formed. The alkali silicofluoride is added to the vortex and stirring is continued until apparent homogeneity results. While the silicofluoride is being admixed into the aqueous anionic dispersions, the dispersion thickens substantially to an extent that it cannot be poured. Upon rapid agitation, the thixotrope is eliminated and the composition flows freely. It is to be noted that silicofluoride salts have low solubility in the dispersions and only so much can be incorporated. The dispersion with the silicofluoride therein can be heated to accelerate thickening. At ambient temperature, although in an apparent coagulated state, the material flows upon agitation.

In order to maintain a stable pH of below 7, and more preferably 5 to 6, it may be desirable to buffer the dispersion with borax or the like.

The thixotropic anionic polyurethane dispersion forming the coating composition is useful in coatings, and more particularly in coatings for substrates having irregular surfaces, i.e. roughening surfaces or weaved patterns. When the coating composition is applied to such an irregular surface, it can be applied at high film thicknesses in a single coat, i.e. 5 to 25 mils solids due to its thixotropic nature. Upon drying by evaporation at ambient temperature or at elevated temperatures, it forms a microporous coating upon the substrate, thereby providing a regular surface, i.e. non-roughening, while hiding weaved patterns and the like. Preferably, the coating is provided at a thickness of 5 to 25 mils, and most preferably below 15 mils dry thickness.

Additionally, the thixotropic polyurethane dispersion may be cast onto a release paper and formed as a free film. The free film may be useful as a constituent in laminates and the like.

The substrates which are most preferably coated with the thixotropic coating composition are porous substrates such as woven and knit fabrics and felts; and non-wovens such as spun-bonded sheets, needled batts and water leaves. Suitable fibers for forming the substrates are the natural fibers, particularly cotton (all-cotton and cotton blends with synthetics such as polyester and nylon); and less desirably, wool, synthetic fibers such as polyester, nylon, acrylics, modacrylics, and rayons. The fibers may be straight or crimped, continuous filament or staple, or of papermaking length. Naturally, choice of fiber, type of substrate, and its construction and weight/unit area will be made on the basis of cost and use requirements, and other considerations commonly recognized in the textile and coated fabric industries, but only contingent upon the particular end use for the coated substrate.

Impregnated porous substrates such as those disclosed in U.S. patent application Ser. No. 188,329, filed Sept. 18, 1980 entitled "Impregnated Non-Woven Sheet Material" and U.S. patent application Ser. No. 188,330, filed Sept. 18, 1980, now U.S. Pat. No. 4,342,805 entitled "Simulated Leather Sheet Material" are also effectively utilized as substrates for the microporous coating composition in accordance with the invention.

The coating technique used in applying the coating composition to the particular substrate is important in forming the final regular surface. Sufficient shear must be imparted during coating to provide liquification and flowability of the thixotrope. If insufficient shear is provided, the thixotrope will remain in a gel-like consistency and irregularity of the coating will result.

Additionally, one of the features of the invention is that due to the thixotropic nature of the composition, it sets on the surface of the substrate rather than penetrating deeply therein. However, the coating composition has excellent adhesion to most substrates to thereby form an acceptable product.

In another aspect of the invention, the coating compositions are useful in coating leather, and more preferably leather splits. The leather splits have a fibrous surface and the finishing thereof requires a hiding of these fibers to form a grain-like layer. The coating composition of the invention provides the hiding of these fibers.

In another aspect of the invention, the coating compositions have been found to be particularly useful in converting grain layer pigskin to a highly acceptable product. As is well recognized, pigskin has a very tough and hard grain layer which makes it particularly abrasion resistant. However, pigskin is characterized by perforations therein due to the hair follicles extending through the entire thickness of the skin. Several attempts have been made to finish pigskin in order to eliminate these perforations.

The coating compositions in accordance with the invention are particularly useful for hiding and filling these perforations due to the hair follicles because of the thixotropic nature of the composition. Thus, pigskin grain layer cn be coated with the composition of the invention which does not telegraph the perforations through a dye or pigment containing finish.

Thus, there are several utilities for the thixotropic polyurethane dispersions of the invention, and most particularly for coating irregular surfaces to impart regularity thereto. The following examples will more fully illustrate the invention.

EXAMPLE 1

To an appropriate sized vessel was charged 100 parts by weight on a solids basis of an aqueous anionic polyurethane dispersion which is set forth in Example 1 of U.S. Pat. No. 4,171,391, incorporated herein by reference. The dispersion had a solids content of 25 percent. One hundred parts by weight of ground silica sold under the trade name Imsil 15, manufactured by Illinois Mineral Co., was charged to the polyurethane dispersion. One hundred parts by weight on a solids basis of a neoprene latex at 47 percent solids sold under the trade name Neoprene 115 having added thereto 5 percent zinc oxide and 2 percent phenolic antioxidant on a solids basis was combined with the polyurethane dispersion and silica. The neoprene was the copolymer of chloroprene and methacrylic acid with an acid equivalent of 0.33 mole carboxyl/kilogram latex solids and dispersed with polyvinyl alcohol. 0.3 percent by weight on the total weight of the charge of borax was added and mixed until homogeneous. The pH of the resultant preparation was 7.5. One percent by weight of sodium silicofluoride, based on the total weight of the charge, was added as a dry powder to the charge while stirring under vortex conditions over a period of 1 minute. The sodium silicofluoride was added into the vortex. Stirring was continued for 15 minutes, and after 7 to 8 minutes after the sodium silicofluoride addition, there was a noticeable thickening of the composition. After the 15 minute agitation period, the composition could not be poured; however, rapid shaking converted the composition to a free flowing pourable mixture. The preparation of the composition was made at room temperature. The pH of the coating composition was about 6.

EXAMPLE 2

An 8 ounce/yard$^2$ cotton polyester blend fabric having a thickness of 20 mils was coated with 2 ounce/yard$^2$ with the composition according to Example 1. The coating was applied by passing the fabric between spaced rolls at a rapid rate of speed sufficient to impart sufficient shear to the coating composition to allow it to flow. The rolls were gapped in order to provide a 25 mil wet film thickness. The coated fabric was placed in a circulating air oven at 250° F. for 1 hour. The coated fabric so produced had a microporous polyurethane/neoprene coating thereon which was non-roughening, i.e. did not telegraph the weave or texture of the fabric. The coated fabric was coated substantially at the surface thereof with very little polymer permeating into the fiber structure. The material had excellent physical properties and aesthetic properties similar to grain leather. A portion of the coated fabric was grained with lizard grain paper (Calcutta Lizard) supplied by S. D. Warr Co. with excellent replication of the grain pattern.

EXAMPLE 3

Example 2 was repeated, except that the fabric was a napped and sheared on both sides, 8 ounce/yard$^2$ cotton polyester blend having a thickness of 30 mils. Examination of the coated fabric in accordance with this example showed that the coating composition permeated the nap, thus providing excellent adhesion between the fabric and the coating composition. The microporous coating on the surface of the fabric was also non-roughening.

EXAMPLE 4

The material of Example 2 was transfer coated with a solvent-based polyurethane film having a grained surface similar to the hair cells of natural leather. The product so produced had excellent physical properties and good appearance. There was no show-through of the fabric, even though the polyurethane film was 1.5 mils thick. The total thickness of the material was 30 mils.

EXAMPLE 5

To an appropriate vessel was charged 1,000 parts by weight of 30 percent solids polyurethane dispersion having a composition in accordance with Example 1 of U.S. Pat. No. 4,171,391. One hundred fifty parts by weight of ground silica sold under the trade name Imsil 15, by Illinois Mineral Co., was charged with agitation and 1.6 parts by weight on total solids of brown dye was charged thereto. The polyurethane dispersions with the silica had a solids content of 39 percent. 11.6 parts of sodium silicofluoride was charged to the polyurethane dispersion and silica previously prepared in the same manner as Example 1. After the 15 minutes of agitation, a gel-like material was formed which was extremely thick and had the texture of meringue.

The thixotropic coating composition, when agitated, became a pourable fluid. The coating composition of Example 5 had good shelf life, as did the composition of Example 1, as evidenced by their conversion to a pourable fluid after storage for 2 weeks.

EXAMPLE 6

A circular knit fabric of nylon 3.4 ounce/yard$^2$ weight and a thickness of 13 mils was coated with the composition of Example 5 in accordance with the coating process of Example 2 to provide a 30 mil microporous dry coating. The basis weight of the coated fabric was 405 g/m$^2$. The density of the microporous layer was 0.6 g/cm$^3$. The material had a leather-like grain break. The surface was extremely regular, similar to polished calf.

EXAMPLE 7

A 100 percent acrylic non-woven felt supplied by Felters Company under Style 3308 having 6.3 ounce/yard$^2$ (212 g/m$^2$) and 50 mils thick was coated by passing the fabric at a rapid rate between rounded spacer bars with an accumulation of the thixotropic coating composition of Example 5 at the face of the top bar. The coating composition provided a wet add-on to the fabric of 280 percent. The coated material was oven dried in a circulating air oven at 250° F. for 1 hour. The coated fabric so produced had a regular surface and did not exhibit a roughening surface, nor did it telegraph the fibrous nature of the substrate.

After drying, the microporous coating was contacted with a platen at 275° F. at contact pressure for 1 minute. The final coated fabric had a thickness of 30 mils and did not require further coating or finishing. The coated fabric had a smooth surface and did not telegraph the fibrous nature of the substrate. The surface was microporous as evidenced by absorption of water into the surface. The material so produced was useful as a shoe liner or the like, presenting a smooth upper surface and a resilient backing which could be cemented to the interior shoe surface.

EXAMPLE 8

A substrate was prepared in accordance with U.S. patent application Ser. No. 188,330 from 100 parts of felt and 125 parts by weight solids of an impregnation composition comprised of a polyurethane dispersion and a nonionic neoprene latex and titanium dioxide, all in equal parts solids. The material was pressed to provide a density gradient along with the grain layer. The compressed layer was sprayed with an aqueous polyurethane dispersion and the composite was pressed in a hot press. Thirty-five mils of the thixotropic coating composition of Example 5 was coated in accordance with Example 7 and dried to form a 15 mil thick microporous coating composition. The microporous coating was contacted with a smooth platen, such as is used for leather finishing, at contact pressure.

The final product had a smooth surface with excellent adhesion of the coating to the substrate. The material also showed excellent grain break comparable to natural grain leather.

EXAMPLE 9

Grain layer pigskin was coated with the coating composition of Example 1 at a level of 1.6 dry grams per 12 grams of pigskin. Upon microscopic examination, it could be seen that the pores or perforations in the pigskin were filled with the coating composition while the composition was still microporous. Although the initial surface of the pigskin was irregular, due to the perforations, the microporous coated product was regular and non-roughening. Under microscopic examination at 20x, the interface between the pigskin and the microporous coating showed that the imperfections and pores were substantially filled.

EXAMPLE 10

A substrate prepared in accordance with Examples 8, but not pressed to develop a grain layer, was coated with the composition of Example 5 in accordance with the process of Example 8. The starting substrate was fibrous at the surface while the coated final product was smooth and did not telegraph the fibrous nature of the starting substrate.

EXAMPLE 11

The composition of Example 5 was cast on a release paper comprising polyester film supported by cellulose paper, by passing between spaced rolls where the rolls had a 35 mil space as described in Example 2 herein. The coated composition was dried at 250° F. for 1 hour. The resulting casting peeled readily from the release paper. The released surface was glossy. The free film was 20 mils thick, was microporous and had a density of 0.6 g/cm$^3$. The free film was pliant with an isotropic stretch of about 200 percent. A portion of the free film was transfer coated to the surface of an impregnated batt 30 mils thick prepared in accordance with U.S. patent application Ser. No. 188,330. The split composition was 100 parts by weight polyester synthetic felt modified with minor proportions of rayon and polypropylene fibers, and 180 parts by weight of a coagulum of the polyurethane dispersion of Example 1 of U.S. Pat. No. 4,171,391, and titanium dioxide (equal weight proportions of polyurethane polymer and titanium dioxide). The transfer coated free film was adhered to the split by an adhesive by passing through the nip of calender rolls with the glossy surface forming the upper portion of the composite. The coated product had the appearance of highly polished calf and exhibited leather-like grain break.

The coated material can be finished further, for example, by graining in embossed calender rolls, top coating with dyed lacquers for styling effects and the like, and used in shoe uppers, pocketbooks, belts and other applications for styled leather.

Thus, in accordance with the present invention, a thixotropic coating composition is provided which imparts a microporous surface to various substrates and further eliminates telegraphing or roughening of the surface. Further, the thixotropic coating compositions in accordance with the invention are indefinitely stable and impart superior properties to substrates coated therewith.

Thus, although the invention has been described with reference to particular materials and particular processes, the invention is only to be limted so far as is set forth in the accompanying claim.

I claim:
1. An aqueous coating composition comprising: an aqueous anionic polyurethane dispersion; and a salt of hydrofluorosilicic acid; wherein the pH of said composition is acidic and said composition is thixotropic.
2. The coating composition of claim 1 wherein said polyurethane dispersion has a solids content of 10 to 50 percent by weight.
3. The coating composition of claim 2 wherein said polyurethane dispersion has a solids content of 20 to 35 percent by weight.
4. The coating composition of claim 1 wherein said polyurethane is a crosslinked polyurethane.
5. The coating composition of claim 1 wherein said salt of hydrofluorosilicic acid is selected from the group consisting of sodium silicofluoride and potassium silicofluoride.
6. The coating composition of claim 1 including a buffer to maintain the pH of the composition below 7.
7. The coating composition of claim 6 wherein said buffer is borax.
8. The coating composition of claim 1 including a nonionically emulsified neoprene latex.
9. The coating composition of claim 8 wherein said neoprene latex is present at a level of up to 65 percent by weight solids of said composition.

* * * * *

UNITED STATES PATENT AND TRADEMARK OFFICE
CERTIFICATE OF CORRECTION

PATENT NO. : 4,448,922

DATED : May 15, 1984

INVENTOR(S) : John R. McCartney

It is certified that error appears in the above-identified patent and that said Letters Patent is hereby corrected as shown below:

Column 3 Line 31 "diclosed" should read --disclosed--.

Column 9 Line 12 "cn" should read --can--.

Column 10 Line 7 "Warr" should read --Warren--.

Signed and Sealed this

Twenty-third Day of October 1984

[SEAL]

Attest:

GERALD J. MOSSINGHOFF

Attesting Officer

Commissioner of Patents and Trademarks